United States Patent Office 2,902,498
Patented Sept. 1, 1959

2,902,498

Δ¹,⁴-ANDROSTADIENES

Josef Fried, New Brunswick, and Richard W. Thoma, Somerville, N.J., assignors to Olin Mathieson Chemical Corporation, New York, N.Y., a corporation of Virginia No Drawing. Application October 27, 1955
Serial No. 543,242

7 Claims. (Cl. 260—397.45)

This invention relates to, and has for its object the provision of, steroids of the general formula

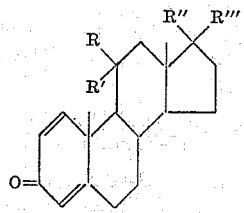

wherein R is hydrogen, R' is α-hydroxy or acyloxy, and together R and R' is keto, and R" is hydrogen, R''' is β-hydroxy or acyloxy, and togther R" and R''' is keto or ketalized keto. These compounds are pharmacologically-active steroids, useful as androgenic agents. Thus, the new steroids of this invention can be used in lieu of known androgenic steroids, such as testosterone propionate, and may be administered either perorally or parenterally in the treatment of eunuchoidism, being formulated for such administration in the same type of preparations as testosterone propionate, for example, with concentration and/or dosage based on the activity of the particular compound.

It has further been found that two of the steroids of this invention, namely Δ¹,⁴-androstadiene-11α,17β-diol-3-one and Δ¹,⁴-androstadiene-11α-ol-3,17-dione can be prepared from 11α-hydroxyprogesterone by subjecting the latter to the action of enzymes of *Fusarium javanicum* var. *ensiforme* QM524 (Quatermaster Culture Collection) or to the action of the organism itself under oxidizing and preferably aerobic conditions; and further, that both of these new steroids can either be oxidized to another one of the steroids of this invention, namely Δ¹,⁴-androstadiene-3,11,17-trione, or esterified to yield their respective acylated derivatives.

Among the steroids formed by the process of this invention are Δ¹,⁴-androstadiene-11α,17β - diol-3 - one and esters thereof, Δ¹,⁴-androstadiene-11α-ol-3,17-dione and esters thereof, and Δ¹,⁴-androstadiene - 3,11,17 - trione. Although all ester derivatives have the androgenic activity of their corresponding free hydroxyl compounds, the preferred esters are those formed from organic carboxylic acids, especially from organic hydrocarbon carboxylic acids having less than ten carbon atoms as exemplified by the lower alkanoic acids (e.g. acetic, propionic and butyric acid), the cycloaliphatic acids (e.g. cyclopentyl propionic acid), the monocyclic aromatic carboxylic acids (e.g. benzoic, toluic, and xyloic acid), and the monocyclic aralkanoic acids (e.g. α-toluic and phenylacetic acid).

To prepare the steroids of this invention, 11α-hydroxyprogesterone is subjected to the action of enzymes of the microorgranism *Fusarium javanicum* var. *ensiforme* under oxidizing conditions. This oxidation can best be effected by either including 11α-hydroxyprogesterone in an aerobic culture of the microorganism or by bringing together, in an aqueous medium, the steroid, air, and enzymes of non-proliferating cells of the microorganism.

In general, the conditions of culturing *Fusarium javanicum* var. *ensiforme* for the purposes of this invention are (except for the inclusion of the 11α-hydroxyprogesterone to be converted) the same as those of culturing various other molds for the production of antibiotics and/or vitamin B-12 i.e., the microorganism is aerobically grown in contact with (in or on) a suitable fermentation medium. A suitable medium essentially comprises a source of nitrogenous and growth-promoting factors and an assimilable source of carbon and energy. The latter may be a carbohydrate (such as sucrose, molasses, glucose, maltose, starch, or dextrin), a fatty acid, a fat and/or the steroid itself. Preferably however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g. soybean meal, corn steep liquor, meat extract and/or distillers solubles) or synthetic (i.e. composed of simple, synthesizable organic and inorganic compounds such as ammonium salts, alkali nitrates, amino acids or urea).

An adequate sterile-air supply should be maintained during fermentation for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period (or rather the time of subjecting the steroid to the action of the enzyme) may vary considerably, the range of about 6 to 96 hours being feasible, but not limiting.

The process yields a mixture of Δ¹,⁴-androstadiene-11α,17β-diol-3-one and Δ¹,⁴ - androstadiene - 11α - ol-3,17-dione, which may be separated by extraction. Each of these products can be esterified in the usual manner, as by treatment with the desired acid anhydride or acyl halide in an organic solvent (preferably an organic base such as pyridine) to yield in the case of Δ¹,⁴-androstadiene-11α,17β-diol-3-one, the diester derivative and in the case of Δ¹,⁴-androstadiene - 11α-ol - 3,17 - dione, the 11α-acyloxy derivative.

Furthermore, the Δ¹,⁴-androstadiene - 11α,17β - diol-3-one and Δ¹,⁴-androstadiene-11α-ol-3,17-dione products can be oxidized in the usual manner, as by treatment with a hexavalent chromium compound (e.g. chromic acid) in an organic solvent (preferably an organic acid such as glacial acetic acid) to give Δ¹,⁴-androstadiene-3,11,17-trione.

The following examples are illustrative of the invention:

EXAMPLE 1

$\Delta^{1,4}$-androstadiene-11$\alpha$,17$\beta$-diol-3-one and
$\Delta^{1,4}$-androstadiene 11$\alpha$-ol-3,17-dione

(a) FERMENTATION

A fermentation medium of the following composition is prepared:

| | G. |
|---|---|
| Starch | 20 |
| Malted Cereal Extract Syrup | 10 |
| Peptone | 20 |
| Cerelose | 44 |
| NaNO$_3$ | 3 |
| KH$_2$PO$_4$ | 1 |
| KCl | 0.5 |
| MgSO$_4$·7H$_2$O | 0.5 |
| FeSO$_4$·7H$_2$O | 0.0183 |

Water to make one liter.

The pH of the medium is adjusted to 7.0±0.1 with 2 N NaOH solution, and 50 ml. portions of the medium are distributed in 250 ml. Erlenmeyer flasks, and the flasks are plugged with cotton and sterilized by autoclaving for 30 minutes at 120° C. When cool, each of the flasks is inoculated with about one-fifth of the suspendable growth from a well-grown *Fusarium javanicum* var. *ensiforme* QM524 agar slant (obtainable, inter alia, from the Quartermaster Culture Collection, Quartermaster General Laboratories, Philadelphia, Pennsylvania). [The growth is obtained by growing the microorganism on Saboround Dextrose Agar (dextrose, 40 g.; neopeptone, 10 g.; agar 15 g.; distilled water to make 1000 cc.) for 3 to 30 days.]

The flasks are then mechanically shaken for 69 hours at 25° C. on a 280 cycle per minute rotary shaker, after which about 4% (v./v.) is transferred to each of 40 flasks containing the following medium:

| | G. |
|---|---|
| Glucose | 20 |
| Starch | 20 |
| Peptone | 10 |
| NaNO$_3$ | 3 |
| KH$_2$PO$_4$ | 1 |
| KCl | 0.5 |
| MgSO$_4$·7H$_2$O | 0.5 |
| FeSO$_4$·7H$_2$O | 0.01 |

Water to make one liter.

and 0.05% of 11$\alpha$-hydroxyprogesterone (total of 1.0 g.). After 96 hours incubation, the flasks are harvested and the contents filtered through a Seitz clarifying pad. The mycelium is washed with 200 ml. of water to give a total volume of filtrate and wash of about 1820 ml.

(b) ISOLATION OF THE $\Delta^{1,4}$-ANDROSTADIENE-11$\alpha$-OL-3,17-DIONE

The thus-obtained culture filtrate is extracted with 3 1500 ml. portions of chloroform and the combined chloroform extracts evaporated to dryness in vacuo. The crystalline residue (about 997 mg.) is dissolved in 3 ml. of chloroform and 15 ml. of benzene and chromatographed on 20 g. of sulfuric acid-washed alumina. Elution chloroform-benzene 1:5 (1300 ml.), 1:0 (300 ml.) and chloroform (100 ml.) furnishes $\Delta^{1,4}$-androstadien-11$\alpha$-ol-3,17-dione, which after recrystallization from acetone-hexane has the following properties: M.P. about 190–192° C.; $[\alpha]_D^{23}+79°$ (c., 0.72 in CHCl$_3$);

$\lambda_{max.}^{alc.}$ 245 m$\mu$ ($\epsilon=17,200$); $\lambda_{max.}^{Nujol}$ 2.97$\mu$ (OH)

5.76$\mu$ (17-keto); 6.01$\mu$, 6.19$\mu$, 6.25$\mu$ ($\Delta^{1,4}$-3-keto).
*Analysis.*—Calcd. for C$_{19}$H$_{24}$O$_3$ (300.38): C, 75.97; H, 8.05. Found: C, 75.65; H, 7.73.

(c) ISOLATION OF THE $\Delta^{1,4}$-ANDROSTADIENE-11$\alpha$,17$\beta$-DIOL-3-ONE Continued elution of the alumina column with chloroform furnishes at first (350 ml.) a mixture of $\Delta^{1,4}$-androstadiene-11$\alpha$-ol-3,17-dione and $\Delta^{1,4}$-androstadiene-11$\alpha$,17$\beta$-diol-3-one (1800 ml.). After crystallization from acetone-hexane the pure substance has the following properties: M.P. about 183–185° C.; $[\alpha]_D^{23}-15°$ (c., 0.64 in CHCl$_3$);

$\lambda_{max.}^{alc.}$ 247 m$\mu$ ($\epsilon=16,100$); $\lambda_{max}^{Nujol}$ 2.92$\mu$, 3.12$\mu$ (OH)

6.05$\mu$, 6.19$\mu$, 6.25$\mu$ ($\Delta^{1,4}$-3-keto).
*Analysis.*—Calcd. for C$_{19}$H$_{26}$O$_3$ (302.40): C, 75.46; H, 8.67. Found: C, 75.74; H, 8.93.

These steroids can then be esterified as illustrated in the following three examples:

EXAMPLE 2

$\Delta^{1,4}$-androstadiene-11$\alpha$-ol-3,17-dione 11$\alpha$-acetate

A solution of 21 mg. of $\Delta^{1,4}$-androstadien-11$\alpha$-ol-3,17-dione in 0.5 ml. of pyridine and 0.5 ml. of acetic anhydride is allowed to stand at room temperature for 18 hours. After removal of the reagents in vacuo the crystalline residue (about 24 mg.) is recrystallized from acetone-hexane yielding the pure acetate of the following properties: M.P. about 243–245° C.; $[\alpha]_D^{23}+101°$ (c., 0.64 in CHCl$_3$);

$\lambda_{max.}^{alc.}$ 242 m$\mu$ ($\epsilon=17,900$); $\lambda_{max.}^{Nujol}$ 5.75–5.80$\mu$ (acetyl and 17-ketone)

6.01$\mu$, 6.18$\mu$, 6.26$\mu$ ($\Delta^{1,4}$-3-ketone).
*Analysis.*—Calcd. for C$_{21}$H$_{26}$O$_4$ (342.42): C, 73.66; H, 7.66. Found: C, 73.83; H, 7.46.

EXAMPLE 3

$\Delta^{1,4}$-androstadiene-11$\alpha$,17$\beta$-diol-3-one 11$\alpha$,17$\beta$-diacetate A solution of 25 mg. of $\Delta^{1,4}$-androstadiene-11$\alpha$,17$\beta$-diol-3-one in 0.5 ml. of pyridine and 0.5 ml. of acetic anhydride is allowed to stand at room temperature for 18 hours. After removal of the reagents in vacuo, the crystalline residue (about 30 mg.) is recrystallized from acetone-hexane yielding the pure diacetate of the following properties: M.P. about 224–225° C.; $[\alpha]_D^{23}+44°$ (c., 0.66 in CHCl$_3$);

$\lambda_{max.}^{alc.}$ 243 m$\mu$ (17,400); $\lambda_{max.}^{Nujol}$ 5.79$\mu$ (acetyl)

6.02$\mu$, 6.18$\mu$, 6.25$\mu$ ($\Delta^{1,4}$-3-ketone).
*Analysis.*—Calcd. for C$_{23}$H$_{28}$O$_5$ (384.45): C, 71.85; H, 7.34. Found: C, 71.59; H, 7.57.

Similarly, by substituting other acid anhydrides, such as propionic anhydride, or acyl halides, such as benzoyl chloride, for the acetic anhydride in the procedures of Examples 2, 3, and 4, the corresponding ester derivatives are produced.

$\Delta^{1,4}$-androstadiene-11$\alpha$,17$\beta$-diol-3-one and $\Delta^{1,4}$-androstadiene-11$\alpha$-ol-3,17-dione can be oxidized to $\Delta^{1,4}$-androstadiene-3,11,17-trione as illustrated by the following example:

EXAMPLE 4

$\Delta^{1,4}$-androstadiene-3,11,17-trione

To a solution of 25 mg. of $\Delta^{1,4}$-androstadiene-11$\alpha$-ol-3,17-dione in 2 ml. of glacial acetic acid is added a solution of 10 mg. of chromic acid in 2 ml. of acetic acid. After 30 minutes at room temperature methanol is added to reduce excess chromic acid and the mixture is taken up in water and chloroform. The chloroform solution is extracted with water, dilute sodium bicarbonate and again with water, dried over sodium sulfate and the solvent removed in vacuo. The residue is crystallized from 95% alcohol yielding pure $\Delta^{1,4}$-androstadiene-3,11,17- trione (1-dehydroadrenosterone) of the following properties: M.P. about 190–191° C. and 197–199° C.;

$$[\alpha]_D^{23} + 258° \text{ (c., 0.66 in CHCl}_3)$$

$\lambda_{max}^{alc.}$ 237 m$\mu$ (15,000); $\lambda_{max}^{Nujol}$ 5.74$\mu$ (17-keto) 5.85$\mu$ (11-keto); 6.03$\mu$, 6.15$\mu$, 6.25$\mu$ ($\Delta^{1,4}$-3-keto).

Analysis.—Calcd. for $C_{19}H_{22}O_3$ (298.37): C, 76.48; H, 7.43. Found: C, 76.72; H, 7.30.

Oxidation of $\Delta^{1,4}$-androstadien-11$\alpha$,17$\beta$-diol-3-one as described above but using twice the amount of chromic acid likewise yields $\Delta^{1,4}$-androstadien-3,11,17-trione identical in all respects with the above described product.

The invention may be variously otherwise embodied within the scope of the appended claims.

We claim:
1. $\Delta^{1,4}$-androstadiene-11$\alpha$,17$\beta$-diol-3-one.
2. The 11$\alpha$,17$\beta$-diester of $\Delta^{1,4}$-androstadiene-11$\alpha$,17$\beta$-diol-3-one and an organic hydrocarbon carboxylic acid of less than ten carbon atoms.
3. $\Delta^{1,4}$-androstadiene-11$\alpha$-ol-3,17-dione.
4. An ester of $\Delta^{1,4}$-androstadiene-11$\alpha$-ol-3,17-dione and an organic hydrocarbon carboxylic acid of less than ten carbon atoms.
5. A steroid of the general formula

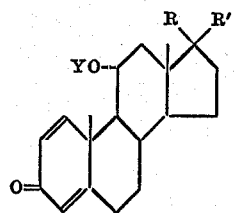

wherein Y is selected from the group consisting of hydrogen and the acyl radical of an organic hydrocarbon carboxylic acid of less than ten carbon atoms, R is hydrogen, R' is $\beta$-OY, and together R and R' is keto.

6. $\Delta^{1,4}$-androstadiene-11$\alpha$-ol-3,17-dione 11$\alpha$-acetate.
7. $\Delta^{1,4}$ - androstadiene - 11$\alpha$,17$\beta$ - diol - 3 - one 11$\alpha$,17$\beta$-diacetate.

References Cited in the file of this patent
UNITED STATES PATENTS

| | | |
|---|---|---|
| 2,378,918 | Fernholz | June 26, 1945 |
| 2,579,479 | Djerassi | Dec. 25, 1951 |
| 2,735,855 | Djerassi | Feb. 21, 1956 |
| 2,736,734 | Sarett | Feb. 28, 1956 |
| 2,837,464 | Nobile | June 3, 1958 |
| 2,864,831 | Eppstein et al. | Dec. 16, 1958 |

OTHER REFERENCES

Experientia, vol. 9, No. 10, October 15, 1953, pages 371–72.

Helv. Chim. Acta, No. 3, vol. 38 (1955), pages 835–40.